United States Patent
Wilson et al.

(10) Patent No.: US 11,746,467 B2
(45) Date of Patent: Sep. 5, 2023

(54) POLYESTER TUFTED CARPET WITH POLYESTER EXTRUSION COATING

(71) Applicant: AURIA SOLUTIONS UK I LTD., London (GB)

(72) Inventors: Ernest Franklin Wilson, Alnemarie, NC (US); Timothy Joel Allison, Marion, NC (US); Sean Bracken Simmons, Concord, NC (US)

(73) Assignee: AURIA SOLUTIONS UK I LTD, London (GB)

( * ) Notice: Subject to any disclaimer, the term of this patent is extended or adjusted under 35 U.S.C. 154(b) by 0 days.

(21) Appl. No.: 17/387,151

(22) Filed: Jul. 28, 2021

(65) Prior Publication Data
US 2022/0042239 A1    Feb. 10, 2022

Related U.S. Application Data

(60) Provisional application No. 63/062,648, filed on Aug. 7, 2020.

(51) Int. Cl.
| | | |
|---|---|---|
| D06N 7/00 | (2006.01) | |
| B32B 37/15 | (2006.01) | |
| D05C 15/04 | (2006.01) | |
| D05C 17/02 | (2006.01) | |

(52) U.S. Cl.
CPC ......... *D06N 7/0076* (2013.01); *B32B 37/153* (2013.01); *D05C 15/04* (2013.01); *D05C 17/02* (2013.01); *D06N 7/0068* (2013.01); *D06N 7/0071* (2013.01); *D06N 2201/02* (2013.01); *D06N 2203/061* (2013.01); *D06N 2205/06* (2013.01); *D06N 2211/066* (2013.01); *D06N 2213/02* (2013.01); *D10B 2503/04* (2013.01); *Y10T 428/23979* (2015.04); *Y10T 428/23993* (2015.04)

(58) Field of Classification Search
CPC .. D06N 7/0068; D06N 7/0071; D06N 7/0076; D06N 2201/02; D06N 2203/061; D06N 2205/06; D06N 2211/066; D06N 2213/02; Y10T 428/23979; Y10T 428/23993; D05C 17/02; D05C 15/04; B32B 37/153; D10B 2503/04
See application file for complete search history.

(56) References Cited

U.S. PATENT DOCUMENTS

| | | | |
|---|---|---|---|
| 5,472,763 A * | 12/1995 | Schwarz | B32B 5/022 428/95 |
| 5,481,786 A | 1/1996 | Smith et al. | |
| 5,538,776 A † | 7/1996 | Corbin | |
| 5,630,896 A † | 5/1997 | Corbin | |
| 2008/0220200 A1 | 9/2008 | Juriga | |
| 2008/0292831 A1 | 11/2008 | Juriga et al. | |
| 2011/0256335 A1 † | 10/2011 | Brumbelow | |
| 2012/0064281 A1 * | 3/2012 | Taylor | D04H 3/007 428/95 |
| 2014/0272262 A1 | 9/2014 | Williams et al. | |
| 2015/0118437 A1 * | 4/2015 | Schulze | B32B 5/26 428/95 |
| 2016/0136844 A1 | 5/2016 | Williams et al. | |
| 2017/0050587 A9 | 2/2017 | Taylor et al. | |
| 2018/0066167 A1 * | 3/2018 | Salsman | D06N 7/0068 |
| 2019/0389094 A1 | 12/2019 | Williams et al. | |
| 2021/0071333 A1 * | 3/2021 | Reynolds | D06N 7/0068 |
| 2021/0087743 A1 * | 3/2021 | Reynolds | D06N 7/0068 |

FOREIGN PATENT DOCUMENTS

| | | | |
|---|---|---|---|
| JP | 2007-105274 A † | 4/2007 | |
| JP | 2014-240271 A † | 12/2014 | |
| KR | 10-2010-0015397 A † | 2/2010 | |
| WO | 2019182738 A1 | 9/2019 | |

OTHER PUBLICATIONS

International Search Report and Written Opinion of International Application No. PCT/US2021/43673, dated Nov. 5, 2021, 11 pages.

\* cited by examiner
† cited by third party

*Primary Examiner* — Cheryl Juska
(74) *Attorney, Agent, or Firm* — Grossman, Tucker, Perreault & Pfleger, PLLC; Steven J. Grossman

(57) ABSTRACT

The present invention relates polyester tufted carpet where the tufts are engaged with a primary polyester backing and where a polyester extrusion coating is applied to the backside of the primary backing to lock the tufts which therefore avoids the use of a latex adhesive.

3 Claims, No Drawings

POLYESTER TUFTED CARPET WITH POLYESTER EXTRUSION COATING

CROSS REFERENCE TO RELATED APPLICATIONS

This application claims benefit of U.S. Provisional Application 62/062,648 filed Aug. 7, 2020, the teachings of which are incorporated herein by reference.

FIELD

The present invention relates polyester tufted carpet where the tufts are engaged with a primary polyester backing and where a polyester extrusion coating is applied to the backside of the primary backing to lock the tufts which therefore avoids the use of a latex adhesive.

BACKGROUND

Tufted fabrics, such as carpets and rugs, are generally made of numerous components and types of materials. Typically, in the tufting operation, yarn is inserted into a first or upper side of the primary backing material. The second or bottom side of the primary backing is then typically coated with a latex in order to adhere the yarn to the backing. Such latex may include a synthetic latex such as a styrene-butadiene latex composition. Carpets having such configuration can be relatively difficult to recycle and may often be disposed in landfill.

When considering the use of carpets in the automotive industry, OEMs typically establish standards for suppliers to achieve with respect to the physical property demands of the vehicle environment. Presently, OEM requirements have generally dictated that polyester tufted carpet utilize latex coatings to achieve the properties necessary for a given vehicle application. Accordingly, a need remains to develop a polyester tufted carpet, for vehicular applications, that would avoid the use of a latex coating, thereby reducing cost and improving recyclability at end of carpet life as well as the ability to more efficiently recycle the by-products of vehicle carpet manufacture.

SUMMARY

A method for manufacturing a carpet, where the method comprises: providing polyester yarn; providing a primary polyester backing having first and second sides; tufting the polyester yarn into a first side of said primary polyester backing where the yarn extends from the second side of the primary backing; extruding polyester and forming a polyester extrudate and applying the polyester extrudate to the second side of said primary backing wherein the polyester extrudate provides a secondary backing layer that engages the polyester yarn extending from the second side of the primary backing wherein the secondary polyester backing layer locks the polyester yarn in the polyester primary backing.

A method for manufacturing a carpet, wherein the method comprises: providing a primary polyester backing having first and second sides; extruding polyester and forming a polyester extrudate and applying the polyester extrudate to the second side of said primary backing and forming a secondary polyester backing layer; and providing polyester yarn and tufting the polyester yarn into the first side of the primary polyester backing and through the secondary polyester backing layer.

A method for manufacturing a carpet comprising: providing a primary polyester backing having first and second sides; extruding polyester and forming a polyester extrudate and applying the polyester extrudate to the second side of the primary backing and forming a secondary polyester backing layer; providing polyester yarn and tufting the polyester yarn into the secondary polyester backing layer and into the primary backing layer.

DETAILED DESCRIPTION OF PREFERRED EMBODIMENTS

The present invention is directed at polyester tufted carpet where the tufts are engaged with a primary polyester backing and where a polyester extrusion coating is applied to the backside of the primary backing to lock the tufts. Such configuration therefore avoids the use of a latex adhesive coating. Such coating process can also be made continuous. In a preferred method form, the present invention stands directed at a method for manufacturing a polyester carpet, comprising the steps of providing polyester yarn, providing a primary polyester backing and tufting the polyester yarn into the primary backing. This may then be followed by extruding a polyester backing onto the back side of the primary backing to form a secondary polyester backing that locks the polyester tuffs in place. Such carpet construction is therefore formed entirely of polyester polymer.

The polyester yarn that is suitable for use herein preferably comprises poly (ethylene terephthalate) (PET). The PET used to provide the tufted yarn may be virgin PET and/or PET obtained from recycled material, such as PET bottles, fabric or carpet waste. The level of recycled PET present may range from 0% (wt.) to 100% (wt.). Accordingly, the level of virgin PET that may be present ranges for 100% (wt.) to 0% (wt.). The PET yarn may preferably utilize fiber diameters range from 800 to 2400 denier, more preferably 900 to 1400 denier.

As noted, the primary backing layer is also polyester based. Preferably, the primary backing is made only from PET and is a spunbond nowoven. The spunbond filaments of such primary backing may also be compacted or bound using calendar treatment. It is also contemplated that the primary backing is a non-woven layer provided by melt-blowing, carding and/or needling. The primary layer may also include a woven layer of yarn, where the yarn is again, preferably made only from PET. The primary polyester backing herein may preferably have a basis weight of 80 g/m$^2$ to 160 g/m$^2$ at a thickness in the range of 0.25 mm to 1.0 mm.

The polyester that is utilized for the extrusion backing is preferably PET and/or a copolymer of PET (coPET). That is, either PET on its own or a blend of PET with coPET. Reference to extrusion backing means that the subject resin is extruded directly onto the backside of the primary backing layer. Accordingly, one may preferably utilize 0-100% (wt.) PET and 100%-0% of coPET. Reference to coPET is reference to the introduction of other diacids, such as isopthalic acid (IPA) and/or other diols, such as cyclohexane dimethanol (CHDM) to the PET. The coPET itself may therefore be preferably selected from one or more of poly (cyclohexylenedimethylene terephthalateglycol) (PCTG), poly (cyclohexylenedimethylene terephthalate/isophthalate glycol) (PCTA) and/or poly (cyclohexylenedimethylene terephthalate) (PCT).

For example, one may utilize a blend of PET and coPET on the back side of the primary backing where coPET is present a level of 1 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. %. Accordingly, the level of coPET may preferably be present in a blend with PET at a level of, e.g., 1 wt. % to 5 wt. %, 1 wt. % to 10 wt. %, 1 wt. % to 15 wt. %, 1 wt. % to 20 wt. %, 1 wt. % to 25 wt. %, 1 wt. % to 30 wt. %, 1 wt. % to 35 wt. %, 1 wt. % to 40 wt. %, 1 wt. % to 45 wt. %, 1 wt. % to 50 wt. %, 1 wt. % to 50 wt. %, 1 wt. % to 55 wt. %, 1 wt. % to 60 wt. %, 1 wt. % to 65 wt. %, 1 wt. % to 70 wt. %, 1 wt. % to 75 wt. %, 1 wt. % to 75 wt. %, 1 wt. % to 80 wt. %, 1 wt. % to 85 wt. %, 1 wt. % to 90 wt. %, 1 wt. % to 95 wt. %.

The polyester yarn, primary polyester layer and polyester backing layer may be formed together as follows. In one embodiment, the polyester yarn can be tufted into a first or upper side of the primary polyester backing layer. This then is followed by extrusion of polyester and formation of a polyester backing layer directly onto a second or bottom side of the primary backing layer. This serves to then bind and lock that yarn tufts. As may be appreciated, the extrusion of the polyester provides a relatively hot and malleable polyester extrudate that can then be readily applied to the primary backing and formed as a secondary backing layer. Alternatively, one may first extrude the polyester backing layer directly onto a selected side of the primary backing layer before the primary backing layer is tufted. Then the polyester yarn can be tufted through the other side of the primary backing layer and into the polyester backing layer.

Preferably, the polyester extrudate that is applied to form the secondary backing layer is such that it has a melting temperature in the range of 120° C. to 260° C. More preferably, it has a melting temperature in the range of 120° C. to 240° C. Even more preferably, the polyester extrudate that is applied to form the secondary backing layer has a melting temperature in the range of 140° C. to 200° C. In addition, as noted, the polyester extrudate can be a blend of PET and coPET such that the melt strength of such polyester blend is sufficient so that it can be readily applied to form the secondary polyester backing noted herein. Along such lines, it is contemplated herein that one may also utilize a branched PET, or even a relatively lightly crosslinked PET, wherein the branched or lightly crosslinked structure also improves the polymer-melt formability.

Accordingly, the present invention relates to a method for manufacturing a carpet, where the method comprises:

providing polyester yarn;

providing a primary polyester backing having first and second sides;

tufting the polyester yarn into a first side of said primary polyester backing where said yarn extends from said second side of said primary backing;

extruding polyester and forming a polyester extrudate and applying said polyester extrudate to said second side of said primary backing wherein said polyester extrudate provides a secondary backing layer that engages said polyester yarn extending from said second side of said primary backing. The secondary polyester backing layer therefore serves to lock the polyester yarn in the polyester primary backing.

The present invention also relates to a second method for manufacturing a carpet, where the method comprises:

providing a primary polyester backing having first and second sides;

extruding polyester and forming a polyester extrudate and applying said polyester extrudate to said second side of said primary backing and forming a secondary polyester backing layer;

providing polyester yarn and tufting the polyester yarn into the first side of said primary polyester backing and through said secondary polyester backing layer.

The present invention also relates to a third method for manufacturing a carpet, where the method comprises:

providing a primary polyester backing having first and second sides;

extruding polyester and forming a polyester extrudate and applying said polyester extrudate to said second side of said primary backing and forming a secondary polyester backing layer;

providing polyester yarn and tufting the polyester yarn into said secondary polyester backing layer and into said primary backing layer.

In product form, the present invention relates to a carpet, suitable for use in a vehicle, comprising, consisting essentially of, or consisting of polyester yarn engaged with primary polyester backing layer and secondary backing layer of polyester extrudate. Such may then be molded into a desired three-dimensional (3D) shape.

The present invention therefore provides a carpet product that consists entirely of polyester and which eliminates the need to utilize a latex backing. The carpet so formed is contemplated to satisfy OEM requirements for vehicle carpeting such as Taber wear protocols. The carpet so formed is also more efficiently recycled given its unitary polyester composition. Along such lines it should be appreciated that the polyesters utilized herein, whether for the yarn, primary backing layer of secondary backing layer, may include non-polymeric components, such as non-polymeric filler materials and other related additives.

Various advantages are therefore contemplated from the present invention. Utilizing all polyester provide a more recyclable tufted carpet with the elimination of latex adhesives and the volatile organic compounds that are associated with the use of such latex. The above disclosure has therefore been made with reference to preferred embodiments and variations and modifications may be made within such scope by those of skill in the art.

What is claimed is:

1. A method for manufacturing a carpet, where the method comprises:

providing polyester yarn comprising poly(ethylene terephthalate) (PET) at 800 denier to 2400 denier;

providing a primary polyester backing comprising poly (ethylene terephthalate) spunbond nonwoven, at a basis weight of 80 g/m$^2$ to 160 g/m$^2$ at a thickness of 0.25 mm to 1.00 mm having first and second sides;

tufting the polyester yarn into a first side of said primary polyester backing where said yarn extends from said second side of said primary backing;

extruding polyester directly onto said second side of said primary backing and forming a polyester extrudate on said second side of said primary backing wherein said polyester extrudate provides a secondary backing layer that engages said polyester yarn extending from said second side of said primary backing wherein the secondary polyester backing layer locks the polyester yarn in the polyester primary backing, wherein said polyester extrudate comprises a blend of branched PET and a copolymer of PET (coPET) having a melting temperature in the range of 120° C. to 200° C. and wherein said coPET is selected from the group consisting of poly (cyclohexylenedimethylene terephthalateglycol), poly (cyclohexylenedimethylene terephthalate/isophthalate glycol) and poly(cyclohexylenedimethylene terephthalate).

2. The method of claim 1 wherein the level of coPET is present in said blend with branched PET at a level of 1 wt. % to 5 wt. %.

3. The method of claim 1 wherein the level of coPET is present in said blend with branched PET at a level of 1 wt. % to 10 wt. %.

* * * * *